UNITED STATES PATENT OFFICE.

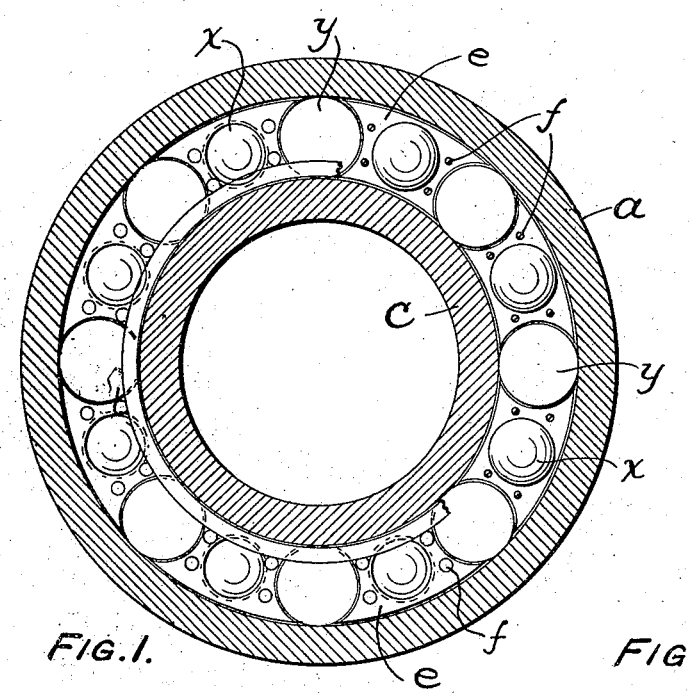
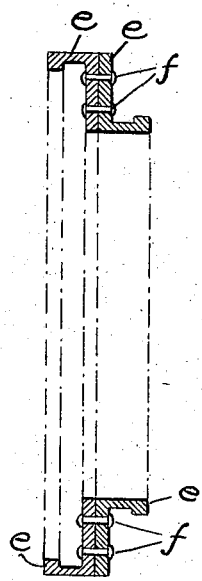
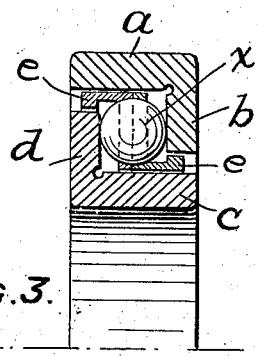
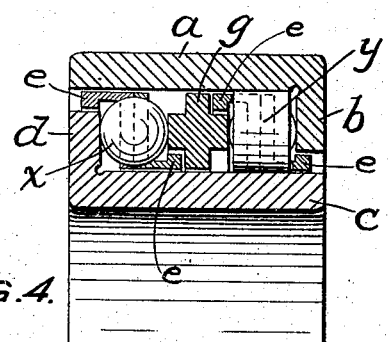
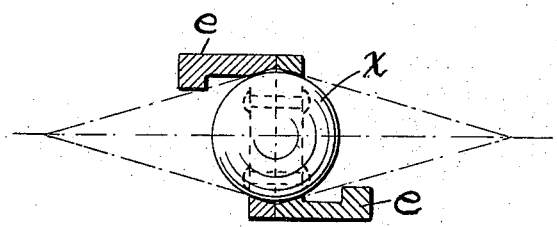
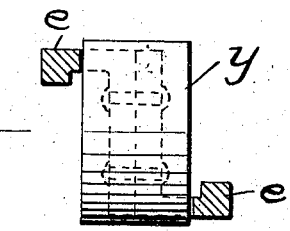

ARCHIBALD B. HUBARD, OF OGONTZ, PENNSYLVANIA.

ANTIFRICTION ROLLER AND BALL BEARING.

1,351,754.  Specification of Letters Patent.  Patented Sept. 7, 1920.

Application filed March 16, 1920. Serial No. 366,272.

*To all whom it may concern:*

Be it known that I, ARCHIBALD B. HUBARD, a citizen of the United States, residing at Ogontz, county of Montgomery, and State of Pennsylvania, have invented a new and useful Improvement in Antifriction Roller and Ball Bearings, of which the following is a full, clear, and exact description, reference being had to the accompanying drawings, which form a part of this specification.

The object of my invention is to provide an antifriction bearing adapted to carry axial and transverse loads.

A bearing comprising an outer and inner race and a series of rollers and balls, arranged preferably alternately, the rollers being of greater diameter than the balls and adapted to take radial loads and the balls being of a diameter exceeding the length of the rollers and adapted to take end thrust, are known in the art.

A bearing of this character is theoretically ideal, but actual embodiments of the conception are open to some or all of the following disadvantages. Their removal and assembly are more or less difficult and tedious. There is more or less grinding action between the rollers and the balls, which in time seriously affects their efficiency. The rollers are apt to get more or less out of parallelism. Perfect operation requires that planes containing tangents between rollers and races, and balls and races, shall be parallel and that these two pairs of parallel planes shall be respectively parallel and normal to the common axis of the races. Otherwise friction, other than rolling friction, develops. A bearing of the type specified, after usage, departs from the ideal relation, with resultant friction other than the indispensable, but almost negligible, rolling friction.

The object of my invention is to so modify the combination roller and ball bearing as to eliminate all grinding action, insure the maintenance of the parallel plane relationship described, and avoid all conditions which tend to produce any friction other than a rolling friction. A further object of my invention is to enable the bearing to be assembled and disassembled as a unit.

The structural features whereby I attain my objects can best be understood by a particular description of the preferred embodiment of my invention illustrated in the accompanying drawings, wherein—

Figure 1 is a transverse sectional view partly broken away.

Fig. 2 is a cross-sectional view of the holding and separating cage.

Fig. 3 is a cross-section through one side of a complete bearing.

Fig. 4 is a similar view of a modification.

Fig. 5 is a constructive view showing the way the balls are retained in the cage.

Fig. 6 is a similar view to Fig. 5 showing the way the rollers are retained in the cage.

The outer race $a$, which is of hardened material, has its rolling surface or path ground cylindrical and with its longitudinal dimension parallel to the axis of the bore. It is provided, at one end, with an inwardly extending annular flange $b$ almost, but not quite, closing that end of the race.

The inner race $c$ is also of hardened and ground material and with its longitudinal dimension parallel to the axis of the bore, its circumferential extension being parallel to that of the outer race and concentric with the axis. At the end thereof opposite the flange $b$, the inner race is provided with an outwardly extending annular flange $d$ almost, but not quite, closing that end of the race.

The drawings show that while the balls $x$ and rollers $y$ are arranged in a conventional way, they are spaced apart by means of a holding and separating cage. This cage is preferably constructed as shown best in Fig. 2. As there illustrated, it comprises two rings $e, e$, each of L-shaped section, one L being upright and the other inverted, the radial member of the two rings abutting and being secured together by rivets $f$, thus forming a compound ring, or cage, somewhat Z-shaped in cross-section.

The rings $e, e$ are adapted to receive the balls by forming in their radial members circular tapered orifices whose inner diameters are slightly larger, and whose outer diameters are slightly smaller, than the diameters of the balls. When the balls are inserted in one ring $e$ and the other ring $e$ is applied to the first ring so that the orifices of the two rings coincide, the balls are held from displacement but have sufficient clearance to revolve freely, as shown in Fig. 5.

The rings e, e are adapted to receive the rollers by cutting away, at intervals, the radial members of the ring throughout their entire radial dimension and also cutting away the lateral flanges of the ring for a sufficient distance beyond such radial members to accommodate the rollers, as shown in Fig. 6.

While the external radial dimension of the ring exceeds the diameter of the balls, it is less than the diameter of the rollers. Hence, when the bearing is inserted between the races, the cage, while freely revolvable with the rollers and balls, cannot contact with either race.

The cutting away of the rings as described involves no sacrifice of their circumferential continuity, the connecting webs, formed by cutting away the rings as described, being sufficiently strong and rigid to maintain the unity of the cage and maintain the rollers parallel and separated from the balls.

It is obvious that during the assembly and disassembly of the bearing, the parts thereof (rollers, balls and cage) are self-contained and are therefore applied or removed as a unit. By maintaining the rollers and balls separated, these elements cannot bear upon one another or grind together. The rollers are maintained parallel with each other and parallel with the common axis of the inner and outer races. The planes containing tangents between rollers and races, and balls and races, are parallel, and these two pairs of parallel planes are respectively parallel and normal to the common axis of the races. Hence only rolling friction can possibly exist.

For light duty bearings a single row of balls and rollers, as shown in Fig. 3, will suffice. For heavy duty bearings, two or more rows of balls and bearings will be employed. Each row is held in a container e, e, corresponding structurally to the container used with a single series bearing. Between two single series bearings is interposed a hardened and ground ring g, preferably cross-shaped in cross-section, as shown in Fig. 4. The ring g is freely revolvable. When end thrust is applied to the bearing, the ring g transmits the load from one series of balls and rollers to another and thus onto the flange d at the end of the inner race.

While I have shown the balls and rollers arranged alternately, this arrangement is not indispensable, nor is it essential that the number of rollers shall correspond to the number of balls.

Having now fully described my invention, what I claim and desire to protect by Letters Patent is:

1. An anti-friction bearing comprising inner and outer races, rollers and balls between the races, and a revolvable cage the body of which extends radially between the races and is partially cut away from the reception of the balls and wholly cut away for the reception of the rollers.

2. An anti-friction bearing comprising inner and outer races and end members, rollers and balls between the races, and a cage, having a radial extension and oppositely extending lateral extensions, adapted to revolve between the races, the radial extension of said cage being cut out to receive and retain the balls and rollers and space them apart.

3. An anti-friction bearing comprising inner and outer races, rollers and balls between the races, and a revolvable circumferential cage comprising a web extending radially of the bearing midway between opposite sides thereof, said web being cut away throughout a part of its radial width to accommodate the balls and throughout its entire radial width to accommodate the rollers.

4. An anti-friction bearing comprising inner and outer races and end members, rollers arranged between and contacting with the races, balls of smaller diameter than the diameter of the rollers and of greater diameter than the length of the rollers also arranged between the races, and a revolvable cage whose radial width is less than the radial width between the races and which is cut out to receive and retain the rollers and balls, space them apart and maintain the axes of the rollers parallel with each other and with the axis of the bearing.

5. An anti-friction bearing comprising inner and outer races, balls rollable between the races, and a circumferentially revolvable cage comprising a web extending radially of the bearing midway between opposite sides thereof, said web having ball-receiving orifices the inner periphery of each of which tapers from each wall of the web away from the axis of the orifice, whereby the balls will be retained in the web while free to rotate.

6. An anti-friction bearing comprising inner and outer races, rollers and balls between the races, a pair of revolvable rings whose radial members are secured together, said rings being of smaller radial width than the diameter of the rollers and of greater combined width, measured axially of the bearings, than the length of the rollers, the radial members of the rings being orificed to hold the balls and permit them to freely rotate, the rings being also cut away throughout their radial width to form pockets for the rollers and leave integral connecting webs along opposite edges, thereby forming a bearing structure adapted to be assembled and disassembled as a unit.

7. An anti-friction bearing comprising inner and outer races, rollers rollable between the races, and a circumferentially revolvable cage comprising a web extending radially of the bearing midway between opposite sides thereof, said web being cut away throughout its width to form roller receiving orifices, said cage also comprising laterally extending members integral with the cage which form connecting webs adjacent the roller receiving orifices.

8. An anti-friction bearing comprising inner and outer races, balls rollable between the races, a pair of revolvable rings, each ring being L-shaped in cross-section, the radial members of said rings being secured together to form a cage suggestively Z-shaped in cross-section, the radial member of each ring having a tapered ball-receiving orifice whose diameter adjacent its abutting wall is greater, and whose diameter adjacent its opposite walls is less, than the diameter of the ball, whereby the balls will be retained in the cage while free to rotate.

9. An anti-friction bearing comprising inner and outer races, rollers between and engaging the races, a pair of revolvable rings, each L-shaped in cross-section, the radial members of which are secured together to form a cage suggestively Z-shaped in cross-section and of less radial width than the space between the races, the radial member and the staggered laterally extending members of the cage being cut away at intervals to form a roller-receiving pocket and integral connecting webs adjacent opposite edges of the cage.

10. An anti-friction bearing comprising inner and outer races, a plurality of circumferential series of rollers and balls, a plurality of revolvable cages, each carrying a circumferential series of rollers and balls, and a floating ring, independent of the cages, between adjacent series of balls and rollers, whereby the end thrust from the balls of one series may be transmitted to the balls of the adjacent series, substantially on a straight line.

In testimony of which invention I have hereunto set my hand, at Philadelphia, Penna., on this 13th day of March, 1920.

ARCHIBALD B. HUBARD.

It is hereby certified that in Letters Patent No. 1,351,754, granted September 7, 1920, upon the application of Archibald B. Hubard, of Ogontz, Pennsylvania, for an improvement in "Antifriction Roller and Ball Bearings," an error appears in the printed specification requiring correction as follows: Page 2, line 66, claim 1, for the word "from" read *for;* and that the said Letters Patent should be read with this correction therein that the same may conform to the record of the case in the Patent Office.

Signed and sealed this 5th day of October, A. D., 1920.

[SEAL.]

M. H. COULSTON,

*Acting Commissioner of Patents.*

Cl. 64—39.